(12) United States Patent
Hinsdale

(10) Patent No.: US 12,385,473 B1
(45) Date of Patent: Aug. 12, 2025

(54) SEMI-PASSIVE LINEAR ACTUATOR

(71) Applicant: Blue Origin LLC, Kent, WA (US)

(72) Inventor: James Andrew Hinsdale, Madison, AL (US)

(73) Assignee: Blue Origin Manufacturing, LLC, Huntsville, AL (US)

( * ) Notice: Subject to any disclaimer, the term of this patent is extended or adjusted under 35 U.S.C. 154(b) by 0 days.

(21) Appl. No.: 18/931,964

(22) Filed: Oct. 30, 2024

(51) Int. Cl.
*F03G 6/06* (2006.01)
*F03G 6/00* (2006.01)
*B64G 1/22* (2006.01)

(52) U.S. Cl.
CPC ............. *F03G 6/002* (2021.08); *F03G 6/098* (2021.08); *B64G 1/222* (2013.01)

(58) Field of Classification Search
CPC .......... F03G 6/002; F03G 6/098; B64G 1/222
See application file for complete search history.

(56) References Cited

U.S. PATENT DOCUMENTS 8,899,761 B2 * 12/2014 Tonar ..................... H04N 23/52
359/511

2002/0088916 A1 * 7/2002 March ....................... B60R 1/04
248/483
2022/0289407 A1   9/2022 Vedant et al.
2022/0323695 A1 * 10/2022 Albertini ................ G16H 40/63

FOREIGN PATENT DOCUMENTS

DE    102009038204 A1   4/2011
EP        1516936 A1   3/2005

OTHER PUBLICATIONS

Haines et al., Artificial muscles from fishing line and sewing thread. Science. Feb. 21, 2014;343(6173):868-72.

* cited by examiner

*Primary Examiner* — Shafiq Mian
(74) *Attorney, Agent, or Firm* — McCarter & English, LLP; Dave S. Christensen

(57) ABSTRACT

A linear actuator and a method of operating is provided. The linear actuator includes a housing having at least one wall made from an electrochromatic material configured to transform from an opaque to a translucent material in response to a voltage. A plunger is slidably coupled to the housing to move between a first position and a second position. An actuator is disposed between the plunger and the housing, the actuator being made from a heat sensitive material, the actuator being configured to change a length of the actuator in response to a change in temperature.

20 Claims, 4 Drawing Sheets

SEMI-PASSIVE LINEAR ACTUATOR

BACKGROUND OF THE DISCLOSURE

The subject matter disclosed herein relates to an actuator, such as a linear actuator that actives in response to a change in temperature.

In space-based systems, linear actuators are used in a variety of applications. Some spacecraft, such as satellites for example, have structures that are deployed once the spacecraft has reached a location. For example, in the case of space-based telescopes, structures such as mirrors and shields may be launched in stowed position and then deployed once the satellite has reached a desired location in orbit. Typically these actuators are either a mechanical actuator such as a solenoid for example. Other actuators may be a single use actuator that uses an explosive charge to release a mechanical fastener.

In addition to deployments of structures or systems, actuators may be used over the life of the spacecraft to adapt subsystems to changing environments or to improve operations. For example, linear actuators may be used to change the orientation/pose of a solar panel to direct the panel towards the sun to improve electrical power generation.

While existing actuators suitable for their intended purposes the need for improvement remains, particularly in providing a linear actuator having the features described herein.

BRIEF DESCRIPTION OF THE DISCLOSURE

According to an aspect of the disclosure, a linear actuator is provided. The linear actuator includes a housing having at least one wall made from an electrochromatic material configured to transform from an opaque to a translucent material in response to a voltage. A plunger is slidably coupled to the housing to move between a first position and a second position. An actuator is disposed between the plunger and the housing, the actuator being made from a heat sensitive material, the actuator being configured to change a length of the actuator in response to a change in temperature.

In addition to one or more of the features described herein, or as an alternative, further embodiments of the linear actuator may include the actuator being made from a polymer fiber.

In addition to one or more of the features described herein, or as an alternative, further embodiments of the linear actuator may include the polymer fiber having one of a polyethylene or a polyamide having two monomers containing six carbon atoms.

In addition to one or more of the features described herein, or as an alternative, further embodiments of the linear actuator may include a power source electrically coupled to the at least one wall.

In addition to one or more of the features described herein, or as an alternative, further embodiments of the linear actuator may include a biasing member coupled to the plunger, the biasing member biasing the plunger towards the first position.

In addition to one or more of the features described herein, or as an alternative, further embodiments of the linear actuator may include a heating element thermally coupled to the actuator.

In addition to one or more of the features described herein, or as an alternative, further embodiments of the linear actuator may include the heating element having a coil member disposed about the actuator.

In addition to one or more of the features described herein, or as an alternative, further embodiments of the linear actuator may include the coil member being configured to selectively heat or cool the actuator.

In addition to one or more of the features described herein, or as an alternative, further embodiments of the linear actuator may include the coil member biasing the plunger towards the first position.

According to another aspect of the disclosure a method of operating a linear actuator is provided. The method includes applying a voltage to an electrochromatic wall of a housing. The method includes allowing sunlight to increase a temperature within the housing based at least in part on the applying of the voltage to the electrochromatic wall. A length of an actuator is changed from a first length to a second length in response to the increase in temperature of the housing, the second length being smaller than the first length. a plunger is moved in a first direction in response to the actuator changing from the first length to the second length.

In addition to one or more of the features described herein, or as an alternative, further embodiments of the method may include removing the voltage from the electrochomatic wall of the housing. The temperature may be reduced within the housing in response to the voltage being removed from the electrochromatic wall. The length of the actuator may be changed from the second length to the first length in response to the reducing of the temperature within the housing. The plunger may be moved in a second direction in response to the changing of the length of the actuator, the second direction being opposite the first direction.

In addition to one or more of the features described herein, or as an alternative, further embodiments of the method may include biasing the plunger in the second direction.

In addition to one or more of the features described herein, or as an alternative, further embodiments of the method may include applying supplemental heat to the housing in response to the temperature within the housing not increasing to a threshold temperature within a predetermined amount of time.

In addition to one or more of the features described herein, or as an alternative, further embodiments of the method may include the supplemental heat being applied with a resistance heater disposed within the housing.

In addition to one or more of the features described herein, or as an alternative, further embodiments of the method may include the supplemental heat being applied by a member coiled about the actuator.

In addition to one or more of the features described herein, or as an alternative, further embodiments of the method may include removing heat from the housing with the member in response to the removing of the voltage.

According to another aspect of the disclosure a linear actuator is provided. The linear actuator includes a power supply and a housing having a first portion made from an electrochromatic material configured to transform from an opaque to a translucent material in response to a voltage from the power supply. A plunger is slidably coupled to the housing to move between a first position and a second position. An actuator is disposed between the plunger and the housing, the actuator being made from a heat sensitive material, the actuator being configured to change a length of the actuator in response to a change in temperature, the actuator being a coiled polymer fiber.

In addition to one or more of the features described herein, or as an alternative, further embodiments of the linear may include a supplemental heater thermally coupled to the actuator.

In addition to one or more of the features described herein, or as an alternative, further embodiments of the method may include the supplemental heater having a conductive wire disposed inside or about the outside of the coiled polymer fiber.

In addition to one or more of the features described herein, or as an alternative, further embodiments of the method may include the polymer fiber having one of a polyethylene or a polyamide having two monomers containing six carbon atoms.

These and other advantages and features will become more apparent from the following description taken in conjunction with the drawings.

BRIEF DESCRIPTION OF DRAWINGS

The subject matter, which is regarded as the disclosure, is particularly pointed out and distinctly claimed in the claims at the conclusion of the specification. The foregoing and other features, and advantages of the disclosure are apparent from the following detailed description taken in conjunction with the accompanying drawings in which:

The detailed description explains embodiments of the disclosure, together with advantages and features, by way of example with reference to the drawings.

DETAILED DESCRIPTION OF THE DISCLOSURE

In many applications, it is desirable to reduce the electrical power draw or load by ancillary equipment, such as actuators for example. In the case of space based systems, such as satellites, the amount of electrical power that may be generated or stored at any one time may be limited. As a result, the power drawn by ancillary equipment may reduce the amount of electrical power for the systems other operations. Since a space based system may not be easily reachable by service personnel to provide additional fuel, electrical power or recharging, the electrical draw by ancillary devices may shorten the service life of the space based system or reduce its operating functionality.

Embodiments of the present disclosure provide for a semi-passive linear actuator. Embodiments of the present disclosure provide for a linear actuator that may be selectively activated using heat. In an embodiment, the linear actuator is activated using sunlight/solar-energy to generate heat and cause a plunger to move from a first or extended position, to a second or retracted position. In an embodiment, linear actuator may have a wall formed by an electrochromatic glass that selectively allows emission of sunlight into the linear actuator. In an embodiment, an auxiliary heater may be provided to allow operation during time periods when the linear actuator is not exposed to the sun. In still further embodiments, a heat sink may be provided to facilitate or shorten the time for the linear actuator to move the plunger from the second position to the first position.

Figure 1:
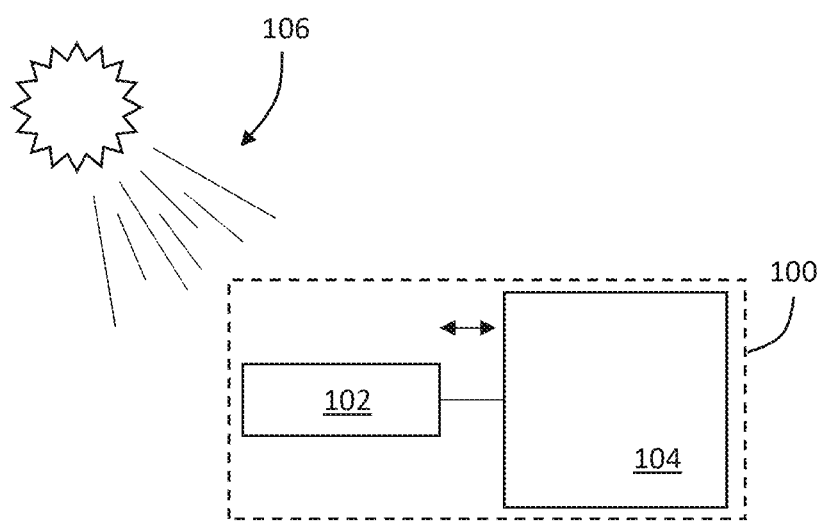
FIG. 1 is a schematic illustration of a system using a linear actuator in accordance with an embodiment.

Referring now to FIG. 1, an embodiment is shown of a system, such as a spacecraft 100 for example, that has at least one linear actuator 102 that is operably coupled or engaged with a structure or sub-assembly 104. The linear actuator 102 cooperates with the sub-assembly 104 to perform an action in response to activation of the linear actuator. As discussed in more detail herein, portions of the linear actuator 102 may be selectively heated by sunlight 106 to activate the linear actuator. The sub-assembly 104 may be any device that is responsive to the linear movement of an actuator device, such as a latch, a hold-down, a shield, or a solar array for example.

Figure 2A:
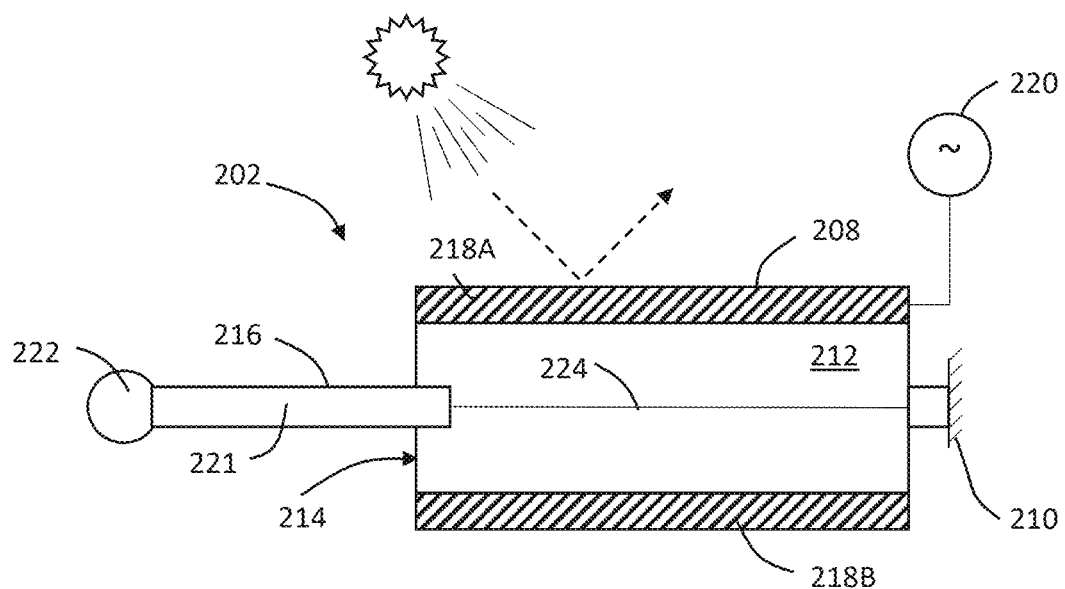
FIG. 2A is a schematic illustration of a linear actuator in a first position for use with the system of FIG. 1 in accordance with an embodiment.
Figure 2B:
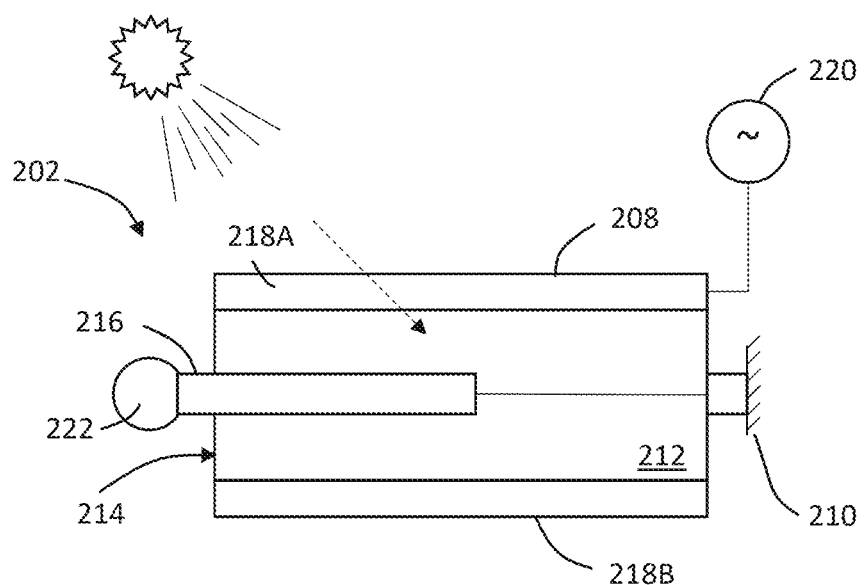
FIG. 2B is a schematic illustration of the linear actuator of FIG. 2A in a second position in accordance with an embodiment.

Referring now to FIG. 2A, and FIG. 2B an embodiment is shown of a linear actuator 202. The linear actuator 202 includes a housing 208 that is coupled to a structure 210. It should be appreciated that while the illustrated embodiment shows the housing as being coupled to the structure 210 on an end, this is for exemplary purposes and the claims should not be so limited. The housing includes a hollow interior area 212 that is in communication with an opening 214. The interior area 212 and opening 214 are configured to receive a plunger 216. In an embodiment, the opening 214 is sealed about the plunger 216. In an embodiment, the interior area 212 may be filled with a gas, such as nitrogen for example.

The housing 208 may be any suitable shape and may have a cross sectional shape (e.g. perpendicular to the view of FIG. 2A) that is circular, square, rectangular, or an irregular/non-planar shape. In the illustrated embodiment, the housing 208 includes at least one wall, such as wall 218A for example, that is made from an electrochromatic material that is configured to selectively be transparent or opaque in response to an applied voltage from a power source 220 for example. It should be appreciated that the electrical power used to change an electrochomatic material from transparent to translucent is considerably less than operating a traditional prior art solenoid or other electromechanical actuator. In an embodiment, the electrical power used to activate the electrochromatic material is between 3-6 Watts/m$^2$. In an embodiment, the electrochromatic material may be a polymer-dispersed liquid crystal (PDLC) type glass, an Indium Tin Oxide (ITO) coating on glass, or an ITO coated on polyethylene terephthalate (PET) film, or a combination of the forgoing. It should be appreciated that while embodiments herein describe the wall 218A as being "glass" this is for example purposes and the claims should not be so limited. In other embodiments, the electrochromatic material may be laminated onto another suitable surface, such as acrylic or polycarbonate for example.

In other embodiments, the wall 218A may alternatively be made from a thermochromatic material that changes color in response to temperature, such as when exposed to sunlight versus when the actuator is shaded from the sun. This may provide advantages in embodiments where the linear actuator 202 is activated (to perform an action) when in either the sun or the shade. For example, when the wall 218A is exposed to, and warmed by, the sun, the color may change from white, which would tend to reflect sunlight, to black and absorb the sunlight to retain heat. Similarly, the wall 218A may be made from a photochromic material that changes color (e.g. between white and black) in response to exposure to light.

In an embodiment, the housing 208 may have a second wall 218B that is also made from an electrochromatic material. The wall 218B may be independently controllable from the wall 218A. In an embodiment, the wall 218B is positioned away from direct sunlight and may be activated (e.g. turned to transparent) to allow radiation of heat from the interior area 212 when it is desirable to lower the temperature of the interior area.

It should be appreciated that when the wall 218A (and optionally wall 218B) is activated by applying a voltage to the electrochromatic material. This causes the electrochromatic material to change from being opaque (e.g. reflecting external light) to transparent, such that sunlight can pass into the interior area 212 as is shown in FIG. 2B. It should be appreciated that when the sunlight passes into the interior area 212, the electromagnetic energy of the sunlight is converted into thermal energy, which will increase the temperature within the interior area 212.

As previously discussed, the housing 208 is configured to slidably receive a plunger 216 therein. The housing 208 may include additional components, such as slides or bearings for example, that allow the plunger 216 to be repeated slid relative to the housing 208. In the illustrated embodiment, the plunger includes an elongated body 221 having a spherical or semi-spherical element 222 on an end. It should be appreciated that the element 222 may be any suitable structure that is configured to engage or perform an action on/with the sub-assembly 104.

The plunger 216 is coupled to the housing 208 by an actuator 224. The actuator 224 is configured to change its length in response to a change in temperature, such as due to a change in temperature in the interior area 212 caused by sunlight for example. In the example embodiment, the actuator 224 is made from a coiled polymer fiber. In an embodiment, the polymer fiber is a polyethylene or polyamide material. In another embodiment, the polymer fiber is a polyamide having two monomers containing six carbon atoms (e.g. Nylon 6 or Nylon 6,6). In an embodiment, the polymer fiber is formed by wrapping highly twisted fibers around a mandrel, which are then stabilized through a thermal annealing process. Depending on the chirality of the fiber relative to the chirality of the coil, the actuator 224 may be configured to either contract when heated (homochiral—as shown in FIG. 2A and FIG. 2B) or expand (heterochiral—when the chirality's are opposite). It should be appreciated that the actuator 224 provides advantages in being a lightweight, relatively low cost, element that can provide significant mechanical work in response to changes in temperature. In an embodiment, the polymer fiber will decrease up to 35% over a temperature range of 20° C.-240° C. In an embodiment, the actuator 224 may provide a load of up to 7252 psi (50 MPa). In an embodiment, the actuator may have a twist to coil ratio of 1430 turns/meter—2270 turns/meter.

Figure 3:
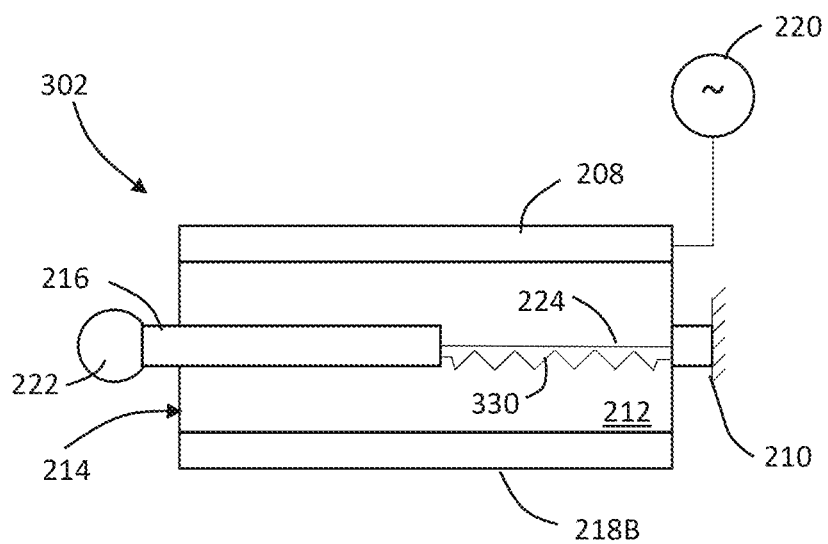
FIG. 3 is a schematic illustration of a linear actuator in accordance with another embodiment.

Referring now to FIG. 3, an embodiment is shown of a linear actuator 302 that may be constructed in a similar manner as linear actuator 202 having an electrochromatic material that is used to allow selective heating of an interior area 212 to cause a change in length of the actuator 224. In this embodiment, a biasing member 330 is coupled to the plunger 216 to bias the plunger to the first or extended position (e.g. FIG. 2A). The biasing member 330 may be a compression spring for example. In the illustrated embodiment, the biasing member 330 is shown as being arranged in parallel with the actuator 224. In other embodiments, the biasing member 330 may be coupled to the plunger 216 in other configurations. In an embodiment, the biasing member 330 may be disposed around or about the actuator 224, such as by extending through the center portion of the coil of the compression spring for example. In other embodiments, the biasing member 330 may be another type of spring, such as an extension spring for example.

Figure 4:
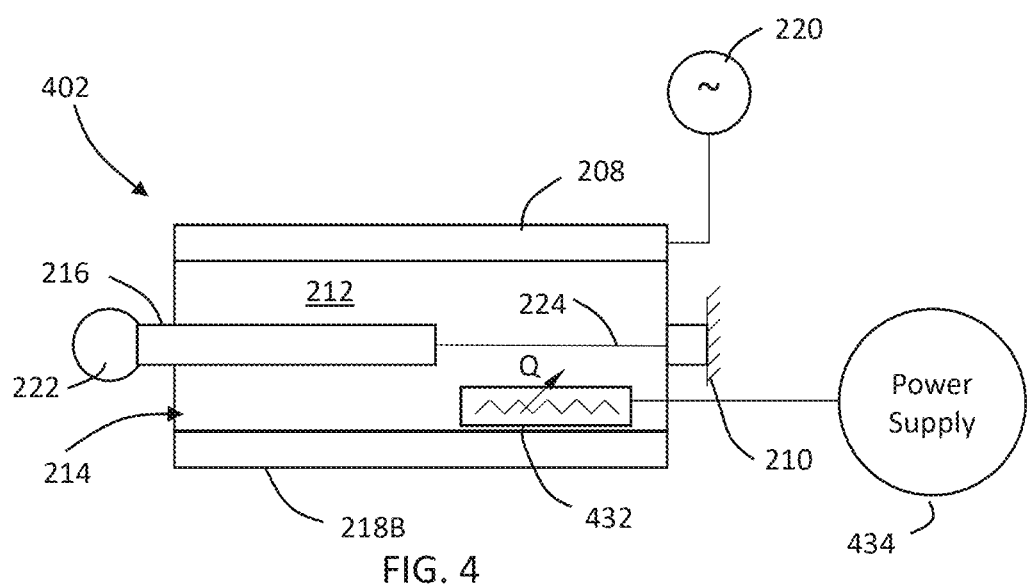
FIG. 4 is a schematic illustration of a linear actuator in accordance with another embodiment.

Referring now to FIG. 4, an embodiment is shown of a linear actuator 402 that may be constructed in a similar manner as the linear actuator 202 having an electrochromatic material that is used to allow selective heating of an interior area 212 to cause a change in the length of the actuator 224. It should be appreciated that there may be instances where it may be desirable to actuate the linear actuator 402 when there is not sufficient solar energy available to heat the interior area 212, such as in the case of a satellite that is in the shadow of the Earth or Moon for example. To accommodate this type of situation, the linear actuator 402 includes an auxiliary heater 432. The auxiliary heater 432 may be a resistance heater that received electrical power from a power source, such a power source 434 for example. In on embodiment the power source 434 is the same as power source 220. The auxiliary heater 432 is configured to transfer heat to the actuator 224 (e.g. via radiation or convention). In other embodiments, the auxiliary heater 432 may be thermally coupled to a heating system of the spacecraft which supplies a heated working fluid to the auxiliary heater 432. By heating the actuator 224 with the auxiliary heater 432 the length of the actuator may be changed even when no or insufficient solar energy is available.

Figure 5:
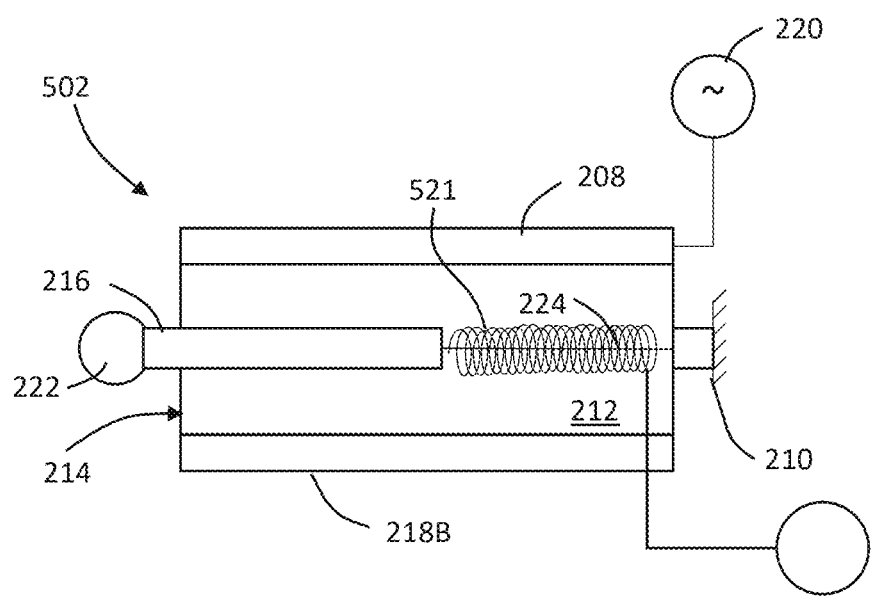
FIG. 5 is a schematic illustration of a linear actuator in accordance with another embodiment.

Referring now to FIG. 5, an embodiment is shown of a linear actuator 502 that may be constructed in a similar manner as the linear actuator 202 having an electrochromatic material that is used to allow selective heating of an interior area 212 to cause a change in the length of the actuator 224. In this embodiment, the auxiliary heater 521 is in the form of a coil that is disposed about the actuator 224. The auxiliary heater 521 is configured to generate heat, such as through electrical resistance or a working fluid for example. The thermal energy is then transferred to the actuator 224 to cause a change in length of the actuator. In one embodiment, the auxiliary heater 521 also provides a biasing force to bias the plunger 216 towards the first or extended position. In another embodiment, the auxiliary heater 521 is coiled into the twisted fibers of the actuator 224.

It should be appreciated that while the embodiments herein describe the use of the linear actuator with respect to a spacecraft or satellite, this is for example purposes and the claims should not be so limited. In other embodiments, the linear actuator may be used in any application where solar energy is available to generate heat. In other embodiments, the linear actuator may be used in a Lunar or other extra-terrestrial environment for example.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It should also be noted that the terms "first", "second", "third", "upper", "lower", and the like may be used herein to modify various elements. These modifiers do not imply a spatial, sequential, or hierarchical order to the modified elements unless specifically stated.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of +8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments described herein.

While the disclosure is provided in detail in connection with only a limited number of embodiments, it should be readily understood that the disclosure is not limited to such disclosed embodiments. Rather, the disclosure can be modified to incorporate any number of variations, alterations, substitutions or equivalent arrangements not heretofore described, but which are commensurate with the spirit and scope of the disclosure. Additionally, while various embodiments of the disclosure have been described, it is to be understood that the exemplary embodiment(s) may include only some of the described exemplary aspects. Accordingly, the disclosure is not to be seen as limited by the foregoing description, but is only limited by the scope of the appended claims.

What is claimed is:

1. A linear actuator comprising:
   a housing having at least one wall made from an electrochromatic material configured to transform from an opaque to a translucent material in response to a voltage;
   a plunger slidably coupled to the housing to move between a first position and a second position; and
   an actuator disposed between the plunger and the housing, the actuator being made from a heat sensitive material, the actuator being configured to change a length of the actuator in response to a change in temperature.

2. The linear actuator of claim 1, wherein the actuator is made from a polymer fiber.

3. The linear actuator of claim 2, wherein the polymer fiber includes one of a polyethylene or a polyamide having two monomers containing six carbon atoms.

4. The linear actuator of claim 1, further comprising a power source electrically coupled to the at least one wall.

5. The linear actuator of claim 1, further comprising a biasing member coupled to the plunger, the biasing member biasing the plunger towards the first position.

6. The linear actuator of claim 1, further comprising a heating element thermally coupled to the actuator.

7. The linear actuator of claim 6, wherein the heating element includes a coil member disposed about the actuator.

8. The linear actuator of claim 7, wherein the coil member is configured to selectively heat or cool the actuator.

9. The linear actuator of claim 6, wherein the coil member biases the plunger towards the first position.

10. A method of operating a linear actuator comprising:
    applying a voltage to an electrochromatic wall of a housing;
    allowing sunlight to increase a temperature within the housing based at least in part on the applying of the voltage to the electrochromatic wall;
    changing a length of an actuator from a first length to a second length in response to the increase in the temperature of the housing, the second length being smaller than the first length; and
    moving a plunger in a first direction in response to the actuator changing from the first length to the second length.

11. The method of claim 10, further comprising:
    removing the voltage from the electrochromatic wall of the housing;
    reducing the temperature within the housing in response to the voltage being removed from the electrochromatic wall;

changing the length of the actuator from the second length to the first length in response to the reducing of the temperature within the housing; and moving the plunger in a second direction in response to the changing of the length of the actuator, the second direction being opposite the first direction.

12. The method of claim 11, further comprising biasing the plunger in the second direction.

13. The method of claim 11, further comprising applying supplemental heat to the housing in response to the temperature within the housing not increasing to a threshold temperature within a predetermined amount of time.

14. The method of claim 13, wherein the supplemental heat is applied with a resistance heater disposed within the housing.

15. The method of claim 13, wherein the supplemental heat is applied by a member coiled about the actuator.

16. The method of claim 15, further comprising removing heat from the housing with the member in response to the removing of the voltage.

17. A linear actuator comprising:
a power supply;
a housing having a first portion made from an electrochromatic material configured to transform from an opaque to a translucent material in response to a voltage from the power supply;
a plunger slidably coupled to the housing to move between a first position and a second position; and
an actuator disposed between the plunger and the housing, the actuator being made from a heat sensitive material, the actuator being configured to change a length of the actuator in response to a change in temperature, the actuator being a coiled polymer fiber.

18. The linear actuator of claim 17, further comprising a supplemental heater thermally coupled to the actuator.

19. The linear actuator of claim 18, wherein the supplemental heater includes a conductive wire disposed inside or about the outside of the coiled polymer fiber.

20. The linear actuator of claim 19, wherein the coiled polymer fiber includes one of a polyethylene or a polyamide having two monomers containing six carbon atoms.

\* \* \* \* \*